UNITED STATES PATENT OFFICE.

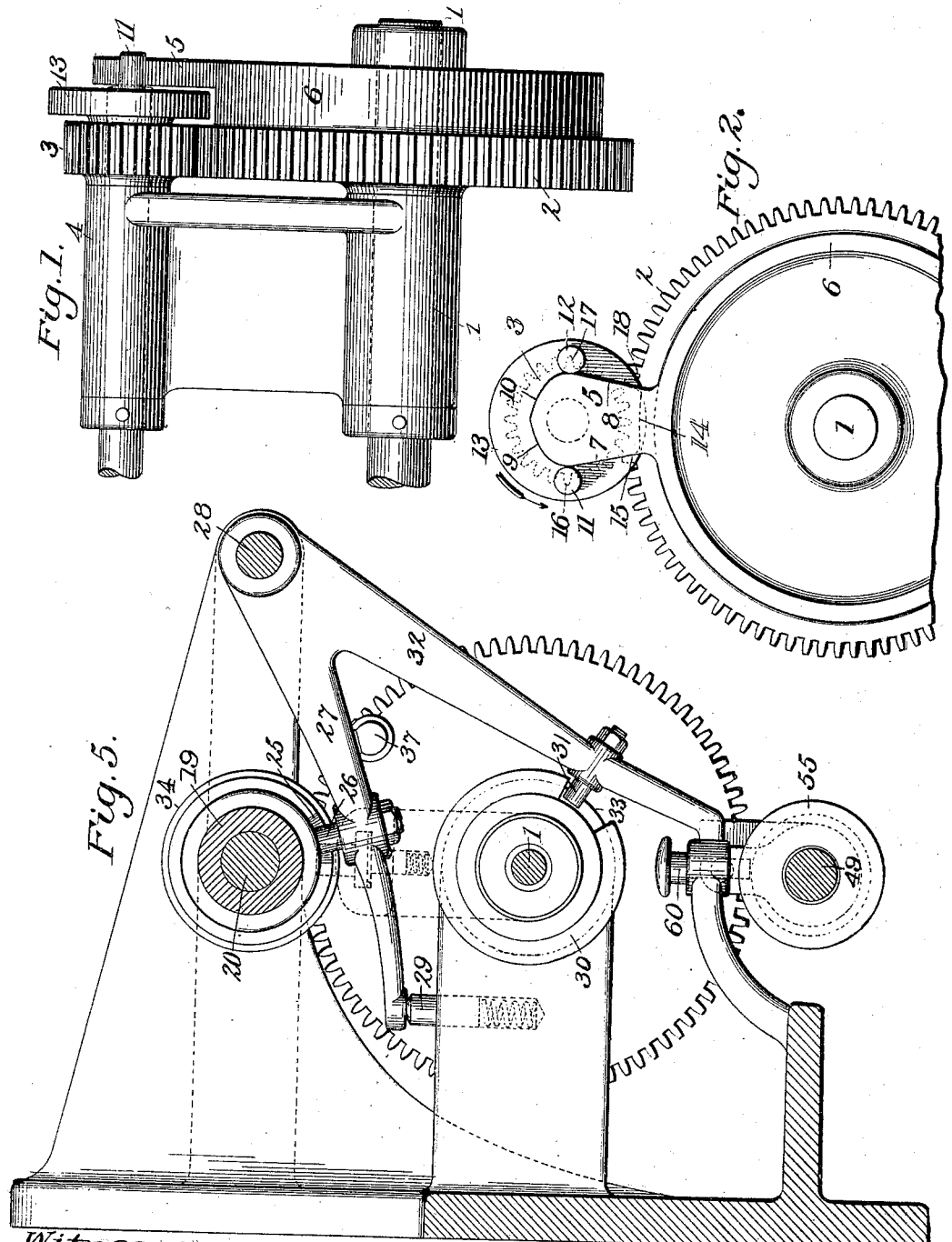

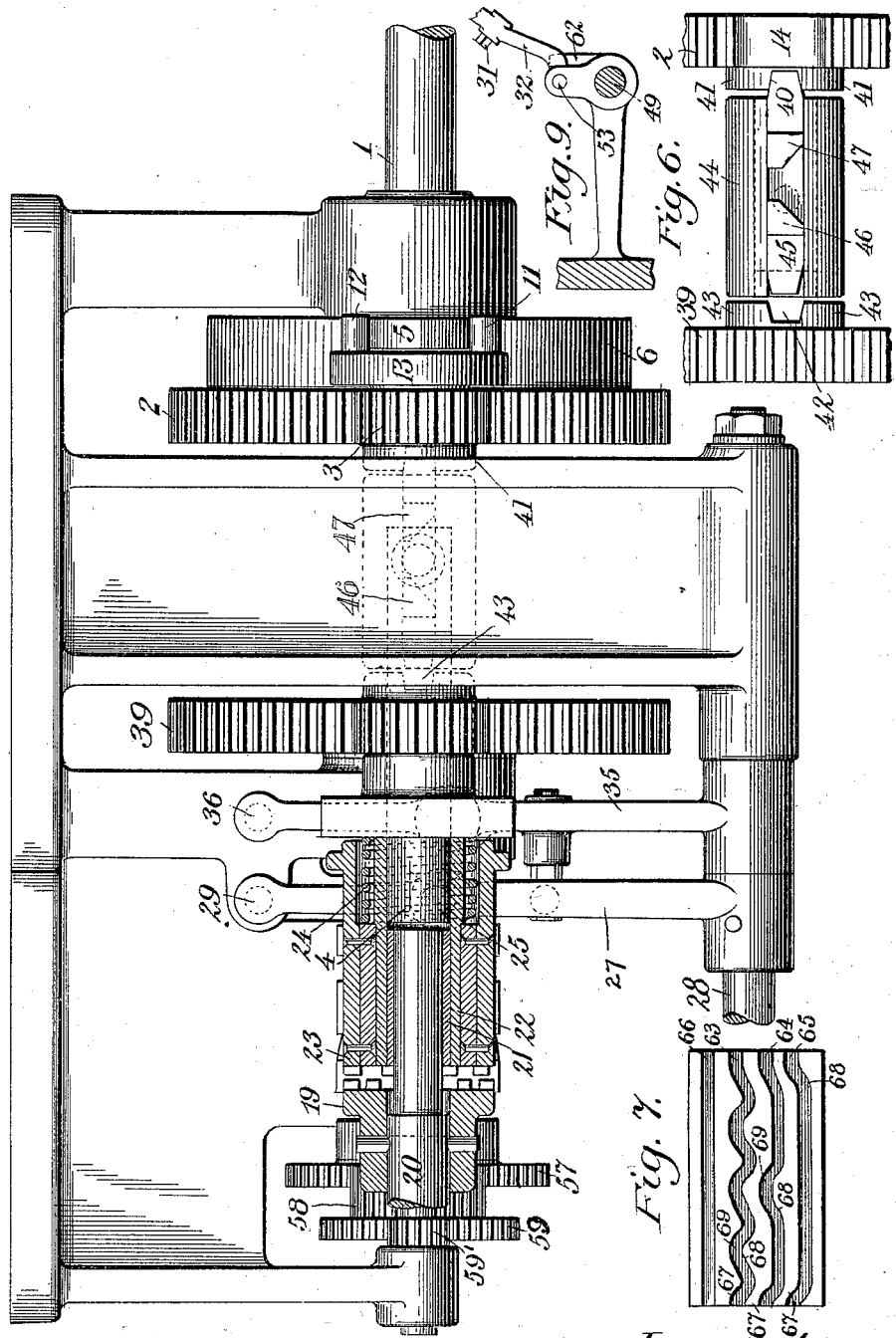

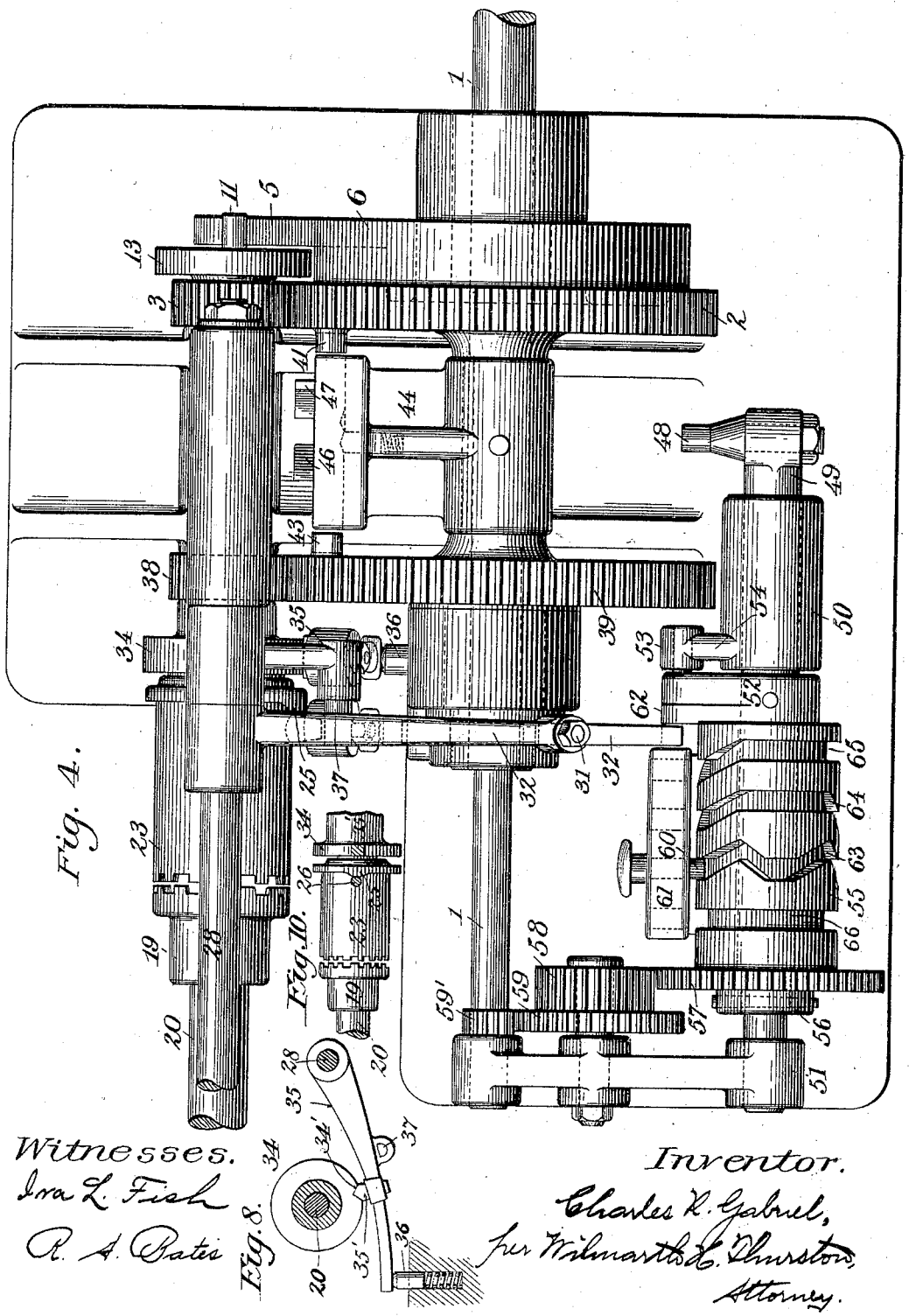

CHARLES R. GABRIEL, OF PROVIDENCE, RHODE ISLAND, ASSIGNOR TO THE BROWN & SHARPE MANUFACTURING COMPANY, OF SAME PLACE.

MECHANICAL MOVEMENT.

SPECIFICATION forming part of Letters Patent No. 645,083, dated March 13, 1900.

Application filed February 23, 1899. Serial No. 706,445. (No model.)

*To all whom it may concern:*

Be it known that I, CHARLES R. GABRIEL, of the city and county of Providence, in the State of Rhode Island, have invented a certain new and useful Mechanical Movement; and I do hereby declare the following specification, taken in connection with the accompanying drawings, forming a part of the same, to be a full, clear, and exact description thereof.

The invention relates to rotary gearing, and more especially to mechanism whereby a rotary gear may be driven for a part of a revolution at a constant speed and be gradually started and stopped without jar or shock.

The invention may be embodied in various mechanisms and may be used in various relations where it is desired to gradually start and stop a mechanism and to drive it at a constant speed during the interval between the starting and stopping or where it is desired to bring a mechanism to rest for an instant at predetermined intervals.

In its simplest form the invention comprises a driven gear, a gear for driving said driven gear, and abutments moving in unison with said driving-gear, arranged diametrically opposite each other, and engaging the opposite sides of a cam-tooth connected with said driven gear. With this construction one of the abutments acts against the one flank of the cam-tooth to start the driven gear from a state of rest and to gradually increase its speed until said gear has the linear velocity of the driving-gear, when said gear is brought into action and drives the driven gear until the other flank of the cam-tooth engages the other abutment, when said abutment acts to gradually bring the driven gear to a state of rest, at which time the cam-tooth lies between the abutments. Thus the driven gear is always under positive control either of the driving-gear or of the abutments and cam-tooth and is started and stopped without shock or jar. The driving-gear may be constantly driven, in which case the driven gear will be brought to rest for an instant at intervals, or the driving-gear may be intermittently driven, in which case the driven gear will be started and stopped without shock or jar and will be held in position when at rest by the abutments and cam-tooth. The shape of the cam-tooth may be varied to give the desired starting and stopping motions and to vary within certain limits the time during which the driven gear is stationary when the driving-gear constantly rotates. The gears may also be so proportioned that the driving-gear will make any desired number of revolutions in driving the driven gear through a single revolution, or more than one cam-tooth may be connected with the driven gear, so that it will be brought to rest before it has made a complete revolution. The mechanism above referred to may also be combined with other gearing, so that a driven shaft may be started and stopped without shock or jar and the number of revolutions made by the driven shaft before it is brought to rest varied as desired.

In the accompanying drawings, Figures 1 and 2 show a side and end elevation, respectively, of gearing embodying the primary features of the present invention in the preferred form. Fig. 3 is a plan view of a mechanism, showing all the features of the present invention in the preferred form. Fig. 4 is a side elevation of the same. Fig. 5 is an end elevation, partly in section; and Figs. 6, 7, 8, 9, and 10 are details of parts to be described.

Referring to Figs. 1 and 2, 1 represents a driven shaft which may be connected with any mechanism which it is desired to operate by the gearing to be described. A gear 2 is secured to said shaft and is arranged to be engaged and driven by a gear 3, secured to a shaft 4. A cam-tooth 5 is connected with the gear 2 in any suitable manner and, as shown, is so connected by a flange 6, which extends from the side of the gear. The cam-tooth 5 is provided with flanks 7 and 8 and with faces 9 and 10 and is arranged to pass between two abutments, which are preferably in the form of pins 11 and 12, as shown. These pins are arranged diametrically opposite each other, and their centers are in line with the pitch-circle of the gear 3. These abutments are rotated in unison with the gear 3 and are preferably secured either directly to the gear 3 or to a disk 13, secured to said gear or the shaft 3. The teeth of the gear 2 are removed at 14 to form a blank space. When the parts are in the position shown in Figs 1 and 2, the gear 2 will be stationary and will be held by the action of the pins 11 and 12 on the tooth 5. Supposing the gear 3 to revolve in the direction of the arrow, the pin 11 will act against the flank 7, starting the gear 6 from a state of rest and gradually increasing the speed of said gear as the pin passes through a quadrant of a circle until when the pin reaches the line of centers of the gears 2 and 3 gear 3 is moving at the same linear speed as gear 2. This movement of the gear 2 brings the tooth 15 into position to be engaged by the tooth 16 of the gear 3, and said gear 3 continues to drive the gear 2 until said gear 2 has made nearly a complete revolution, when the flank 8 engages the pin 12, and at the same time the tooth 17 of gear 3 leaves the space 18 of gear 2. Now as the gear 3 revolves the pin 12 acts against the flank 8 to gradually retard the gear 2 until said gear is brought to a state of rest, when the parts arrive at the position shown in Figs. 1 and 2. When the pin 11 is acting on the flank 7, the pin 12 passes over face 10 and holds the pin 11 and flank 7 in engagement, and when pin 12 engages flank 8 pin 11 passes over face 9. Thus the gear 2 is started gradually and is engaged with the gear 3 when moving at the same speed and after nearly completing a revolution is disengaged from gear 3 and gradually brought to rest.

In the mechanism shown the sizes of the gears 2 and 3 and the number of teeth in each are so related and the shape of the cam-tooth is so proportioned that the shaft 4 makes four revolutions in revolving the shaft 1 one revolution. It will be understood, however, that this particular ratio and construction is selected merely for the purpose of illustration and that the parts may be proportioned so that the driving-gear will make the same number of revolutions as the driven, or the ratio between the revolutions of the two gears may be otherwise varied. It will also be understood that, if desired, more than one cam-tooth may be connected with gear 2, so that said gear will be brought to rest before it has completed a revolution. If the driven gear is brought to rest at each revolution of the driving-gear, it will be obvious that the teeth between tooth 16 and tooth 17 will not act on the gear 2 and said teeth may be removed instead of forming blank spaces 14 on gear 2. The flanks 7 and 8 of the cam-tooth may be changed to vary the motion given to the gear 2 in starting and stopping, in which case the faces 9 and 10 will be correspondingly changed. It is preferred, however, to make these flanks parallel to lines drawn from the center of the pins 11 and 12 through the center of gear 2, as with this form of flank the gear 2 will be started and stopped with a harmonic motion. The upper ends of the flanks may be slightly curved, if desired, so that the gear 2 will be brought to rest slightly before the gear 3 arrives in the position shown. If desired, however, this curve may be omitted, so that there will be no lost motion between pins 11 and 12 and tooth 5, in which case the gear 2 will be stopped and started with a pure harmonic motion and there will be no dead-time between the stopping and starting of gear 2 when gear 3 is rotated continuously.

The shape of the abutments may be varied, if desired; but it is preferred to make the engaging surfaces of said abutments arcs of circles the centers of which are in the pitch-surface of the gear 3.

The shaft 4 may be driven either continuously or intermittently, and when driven intermittently should make as many revolutions before coming to rest as may be necessary to bring the cam-tooth between the rotary abutments. Thus in the construction shown, in which one cam-tooth is used and the parts are so proportioned that the driving-shaft makes four revolutions to one of the driven, the shaft 4 should be given four revolutions before it is brought to rest. In Figs. 3, 4, and 5 is shown a preferred form of mechanism for driving the shaft 4 intermittently, which is as follows: A clutch member 19 is secured to a constantly-running shaft 20, the end of which has a bearing in a bushing 21, which is mounted in the end of a sleeve 22, secured to the shaft 4. A clutch member 23 is keyed to slide on the sleeve 22 and is pressed toward the clutch member 19 by a spring 24, said clutch members 19 and 23 forming an intermittently-operating driver for operating the shaft 4. The clutch member 23 is held out of engagement by a cam 25, carried by said member, which engages an abutment in the form of a pin 26 on the end of an arm 27. The arm 27 is secured to a rock-shaft 28 and is held in position by a spring-pressed pin 29, which engages the end of arm 27. When the arm 27 is rocked, as it may be by any suitable means, the pin 26 is moved out of the path of the cam 25 and allows the clutch to be engaged. The shaft 4 is now revolved until the pin 26 is again brought into the path of the cam 25, when said cam acts to force the clutch member 23 back and disengage the clutch. The pin 26 may be held out of the path of the cam 25 for the proper length of time by any suitable means, and in the construction shown is so held by a disk 30, secured to shaft 1. This disk is arranged to engage the end of a pin 31, projecting from an arm 32, secured to the shaft 28. The disk is provided with a notch 33, in which the pin 31 normally stands. When the shaft 28 is rocked and the shaft 1 begins to revolve, the disk passes under the pin 31 and prevents the return of the pin 26 into the path of cam 25 until the shaft 1 has nearly completed a revolution. A disk 34 is secured to the shaft 4 and is provided with a V-shaped notch 34', which is engaged by the V-shaped end of a pin 35', carried by an arm 35, loosely mounted on shaft 28 and held in position by a spring-pressed pin 36. A pin 37 projects laterally from the arm 35 and engages the under side of the arm 27. When arm 27 is rocked to withdraw the pin 26, arm 35 is also rocked to withdraw the pin carried thereby from the notch in disk 34, and when the pin 26 is returned the pin carried by arm 35 rides on disk 34 and engages the V-shaped notch, thus drawing the clutch-cam around sufficiently to prevent the clutch-teeth clicking after the teeth disengage and preventing the cam 25 running by the pin 26 and holding the shaft 4 in position until the pin 26 is again withdrawn.

When the above mechanism is used to drive the shaft 4, it will be seen that said shaft is started suddenly at full speed and as suddenly brought to a stop when the clutch is thrown out. The gear 2, however, will be gradually started and stopped, although it will be driven at full speed for the greater portion of its revolution. In order that the clutch in the above form of driving mechanism may be disengaged properly, it is desirable that there shall be little or no resistance to the rotation of shaft 4 when said clutch is thrown out—that is to say, it is advantageous that the clutch should not be doing any work other than overcoming the resistance of spring 24 while the cam 25 is withdrawing the clutch member 23. It is preferred, therefore, to so form the tooth 5 that the gear 2 will be brought to rest slightly before the abutments reach the position of Fig. 2, thus causing the shaft 4 to have a slight idle movement after the gear 2 has come to rest.

It may in some cases be desirable to start and stop the shaft 1 gradually and without shock or jar and to rotate said shaft at a substantially-constant speed for more than one revolution between the starting and stopping, and in Figs. 3, 4, and 5 is shown a mechanism for accomplishing this result and also for varying the number of revolutions made by shaft 1 between the starting and stopping. As shown in these figures, the gear 2 is loosely mounted on the shaft 1 and is connected thereto by means to be described. A gear 38 is secured to shaft 4 and engages a gear 39, loosely mounted on shaft 1. The gear 2 is provided with socket 40, formed between two lugs 41, projecting from said gear, and gear 39 is provided with a similar socket 42, formed between lugs 43. These sockets stand opposite each other when the pins 11 and 12 are in the position shown in the drawings. An arm 44 is secured to the shaft 1 and is provided with a sliding bolt 45, adapted to engage one or the other of sockets 40 or 42 and connect gear 2 or 39 to the shaft 1. The gear 38 is one-fourth the diameter of gear 39, and the shaft 1 will therefore be revolved one revolution for every four revolutions of shaft 4 whether gear 2 or gear 39 is connected therewith, the difference being that when gear 39 is connected with shaft 1 said shaft is not brought to rest at every fourth revolution of shaft 4, but rotates continuously as long as shaft 4 rotates. When it is desired to stop the shaft 1 at the end of each revolution, the bolt 45 is engaged with the socket 40 and remains in engagement therewith, the gear 39 running idly on shaft 1. When it is desired to rotate shaft 1 through more than one revolution before it is brought to rest, the gear 39 is connected with shaft 1 during the starting of shaft 1, and then the bolt 45 is shifted into the socket 42, thus connecting gear 39 with said shaft and disconnecting gear 2, which runs idly thereon. The gears 38 and 39 now drive shaft 1 continuously until it is desired to stop said shaft, when the bolt 45 is shifted back into the socket 40 to connect gear 2 with shaft 1 and disconnect gear 39. As part of the revolution of gear 3 is consumed in starting and stopping the gear 2, the gear 3 will drive gear 2 at a slightly-higher rate of speed than gear 39 is driven, and the sockets 40 and 42 will be opposite each other at only two points in the revolution of gears 39 and 2— namely, when the parts are in the position shown and when the gears have made a half-revolution. Means are therefore provided for shifting the bolt 45 from one gear to the other when the gears have made a half-revolution from the positions shown. The bolt 45 is provided with two cam-lugs 46 and 47, constructed to engage an abutment in the form of a roll 48, mounted on a sliding shaft 49. The distance between the lugs 46 and 47 is such that the lugs may pass on opposite sides of the roll 48, and after the bolt has been shifted by one of the lugs it will remain in its position until the roll 48 is shifted into the path of the other lug, when said lug will operate against said roll to shift the bolt. The position of the roll 48 may be controlled in any suitable manner, and in the drawings is shown a form of mechanism for controlling said roll, so that the shaft 1 may be brought to rest at each revolution, or after two revolutions, or after four revolutions, or after eight revolutions. This mechanism is as follows: The shaft 49 is mounted to slide in bearings 50 and 51 and is held from rotation by an arm 52, secured thereto and carrying a pin 53, which slides in an arm 54 on bearing 50. A cam-drum 55 is loosely mounted on shaft 49, between the arm 52 and a collar 56, secured to the shaft. A gear 57 is secured to the cam-drum 55 and is connected by gears 58, 59, and 59' with the shaft 1, the gearing being so proportioned that shaft 49 makes one revolution for eight revolutions of shaft 1. The drum 55 is provided with three cam-grooves 63, 64, and 65 and also an annular groove 66, and a pin 60 is arranged to engage any one of said grooves. The pin 60 is mounted in a stationary arm 61, provided with four holes corresponding to the four grooves in the drum 55. The arm 52 is provided with a stop 62, arranged to move back of the end of arm 32 and prevent the pin 25 from returning into the path of cam 26.

If the shaft 1 is to be brought to rest after each revolution, then pin 60 is arranged to engage the groove 66 and roll 48 remains in the position shown. Supposing, however, that it is desired to bring the shaft 1 to rest only at the end of two revolutions, then the pin 60 is arranged to engage groove 63, as shown in Fig. 4, and in this case the action is as follows: When the shaft 28 is tripped, the shaft 4 is revolved and the gear 2 started by the pins 11 and tooth 5, and the shaft 1 is driven for a half-revolution by the gears 2 and 3, as above described. While the shaft 1 is making a half-revolution the cam-drum 55 is advanced and the cam 67, Fig. 7, acts on pin 60, thus moving shaft 49 and roll 48 to the left, Fig. 4. This brings the roll 48 into the path of lug 46 and brings stop 62 behind arm 32. The shaft 4 makes two revolutions in turning gear 2 a half-revolution, and consequently gear 38 during this time turns gear 39 a half-revolution, thus bringing socket 42 into line with socket 40. As lug 46 passes roll 48 the incline on said lug acts against said roll, and the bolt 45 is shifted from socket 40 to socket 42 and shaft 1 is driven by gear 39. As soon as the lug 46 has passed roll 48 the cam 68 acts on pin 60 and the shaft 49 is shifted, so that when the lugs 46 and 47 again pass said roll lug 47 acts against said roll and shifts the bolt 45 into socket 40 again. The gear 2 now drives cam shaft 1 until the tooth engages pin 12, when the gear 39 and shaft are gradually brought to rest. At this time the pin 31 has entered into the notch in disk 30 and the shaft 4 is stopped, as before described. When the shaft 1 has thus been brought to rest, the pin 60 is at the point 69 in the cam-groove 63, the drum having been advanced one-fourth of a revolution. Thus the shaft 1 is given two revolutions before it is brought to rest, the gear 2 driving said shaft for a half-revolution, then gear 39 driving said shaft for a revolution, and then gear 2 driving said shaft for a half-revolution. The pin 31 is prevented from entering the recess in disk 30 at the end of the first revolution of shaft 1 by the stop 62, which has not at this time been moved from behind arm 32. The cam-groove 63 has four duplicate sets of cams 67 and 68 and points 69, and the drum 55 is advanced a fourth-revolution each time the shaft 28 is rocked. The cam-groove 64 has only two sets of cams 67 and 68 and points 69, and if the pin 60 is arranged to engage this groove the roll 48 will not be moved back to engage lug 47 until shaft 1 has revolved three and a half-revolutions. The shaft 1 will therefore make four revolutions before being brought to rest, being driven three revolutions by gear 39 and two half-revolutions by gear 2. The cam-groove 65 has only one set of cams, and, with the pin 60 in this groove, the shaft 1 will be driven eight revolutions before being brought to rest. By varying the speed of cam-drum 55 and the arrangement of cams the shaft may be given any desired number of revolutions before being brought to rest. It will be understood that the cam-drum may be held from longitudinal movement and the pin 60 be connected with the shaft 49 or the construction otherwise varied without departing from the invention.

What I claim as my invention, and desire to secure by Letters Patent, is—

1. The combination of a driven gear, of a driving-gear, a cam-tooth connected with said driven gear, and two diametrically-opposite abutments rotating with said driving-gear and arranged to simultaneously engage opposite sides of said cam-tooth.

2. The combination of a driven gear, a driving-gear, a cam-tooth connected with said driven gear, and two abutments having cylindrical simultaneously-engaging surfaces for engaging opposite sides of said cam-tooth, the centers of said engaging surfaces being arranged diametrically opposite each other and in the pitch-surface of said driving-gear.

3. The combination of an unmutilated driving-gear, a driven gear having a blank space, means for starting said driven gear with a gradually-increasing speed and engaging said gears when both are moving at the same speed, and means for gradually bringing said driven gear to a state of rest when said gears are disengaged.

4. The combination of a driven gear, a cam-tooth connected therewith having flanks parallel to radial lines of said gear, a driving-gear, two abutments rotating with said driving-gear, and having cylindrical engaging surfaces the centers of which are diametrically opposite each other and in the pitch-surface of said driving-gear.

5. The combination of a gear 2 provided with blank space 14, a gear 3 for engaging gear 2, a cam-tooth 5 connected with gear 2 and extending beyond the center of gear 3, and pins 11 and 12 connected with gear 3.

6. The combination of a gear 2 provided with blank space 14, a gear 3 for engaging gear 2, a cam-tooth 5 having flanks parallel to radial lines of the gear 2, and pins 11 and 12 having their centers in the pitch-surface of gear 3 and connected with said gear.

7. The combination of a driven gear provided with a blank space, a driving-gear which makes a plurality of revolutions for each revolution of the driven gear, a cam-tooth connected with said driven gear, and two abutments rotating with said driving-gear for engaging opposite sides of said cam-tooth.

8. The combination of a driven gear provided with a blank space, a driving-gear, two diametrically-opposite abutments having their centers in the pitch-surface of said driving-gear and rotating therewith, a cam-tooth connected with said driven gear and arranged to lie between said abutments when the blank space is opposite the driving-gear.

9. The combination of a driven gear, a driving-gear which makes a plurality of revolutions for one revolution of the driven gear, means for starting said driven gear with an accelerated speed and engaging said gears when both are at the same speed, and means for stopping said driven gear at the end of a single revolution with a retarded speed when said gears are disengaged.

10. The combination of a driven gear, of a driving-gear which makes a plurality of revolutions for one revolution of the driven gear, two abutments rotating with the driving-gear, said driven gear having two engaging surfaces connected therewith for coacting with said abutments in gradually starting said driven gear and gradually stopping said driven gear at the end of each revolution.

11. The combination of a driven gear 2, a cam-tooth 5, connected therewith having flanks 7 and 8 rounded off at their outer ends, a driving-gear 3, pins 11 and 12 connected therewith and arranged to engage the flanks 7 and 8.

12. The combination of a driven gear 2, a cam-tooth 5 connected therewith having flanks 7 and 8 and faces 9 and 10, a driving-gear 3, pins 11 and 12 connected therewith and arranged to engage the said flanks and faces.

13. The combination of a driven gear 2, a cam-tooth 5 connected therewith having flanks 7 and 8, rounded off at their outer ends, a driving-gear 3, pins 11 and 12 connected therewith and arranged to engage said flanks, a clutch for driving-gear 3, a cam on said clutch, an abutment for engaging said cam and disengaging said clutch, and means for tripping said abutment.

14. The combination of a driven gear, a cam-tooth connected therewith, a driving-gear, two abutments rotating with said driving-gear arranged to simultaneously engage the opposite sides of said cam-tooth, and an intermittently-operating driver for said driving-gear.

15. The combination of a driven gear, a cam-tooth connected therewith, a driving-gear, two abutments rotating with said driving-gear arranged to engage opposite sides of said cam-tooth and means for stopping the rotation of said driving-gear after each revolution of said driven gear.

16. The combination of a driven gear, a cam-tooth connected therewith, a driving-gear, two abutments rotating with said driving-gear arranged to engage opposite sides of said cam-tooth, a driver for said driving-gear, means for intermittently throwing said driver into operation, and means for throwing said driver out of operation when the cam-tooth lies between said abutments.

17. The combination of a driven gear, a cam-tooth connected therewith, a driving-gear, two abutments rotating with said driving-gear arranged to engage opposite sides of said cam-tooth, a constantly-running shaft, a clutch for coupling said driving-gear to said shaft, a cam on said clutch, an abutment for engaging said cam and disengaging said clutch, and means for tripping said abutment.

18. The combination of a constantly-running shaft, a second shaft, a clutch for coupling said shafts together, a cam on said clutch, an abutment for engaging said cam and disengaging said clutch, a driving-gear secured to said second shaft, two diametrically-opposite abutments arranged in line with the pitch-surface of said gear and carried by said second shaft, a driven gear engaged by said driving-gear having a blank space, a cam-tooth connected with said driven gear and arranged to be engaged by said abutments.

19. The combination of a driven gear, a cam-tooth connected therewith, a driving-gear, two diametrically-opposite abutments rotating with said driving-gear and arranged to engage opposite sides of said cam-tooth, the flanks of said cam-tooth being rounded off at their outer ends, so that said abutments may move through a short arc without moving said driven gear, a clutch for driving said driving-gear, a cam on said clutch, an abutment for engaging said cam and disengaging said clutch, and means for tripping said abutment.

20. The combination with a shaft, of devices for starting said shaft with an accelerated speed and stopping said shaft at the end of a plurality of revolutions with a retarded speed, and gearing for driving said shaft at a substantially-constant speed between the starting and stopping.

21. The combination with a shaft, of two gears loosely mounted thereon, a driving-shaft, a gear thereon meshing with one of said gears, devices for starting the other gear with an accelerated speed and stopping said gear with a retarded speed, devices for coupling either of said gears to the shaft and uncoupling the other.

22. The combination with a shaft, of two gears loosely mounted thereon, a driving-shaft, a gear thereon meshing with one of said loose gears, a second gear thereon for engaging the second loose gear, a cam-tooth connected with said second gear, two abutments rotating with said driving-shaft and arranged to engage opposite sides of said cam-tooth, and means for coupling either of said loose gears to the driven shaft and uncoupling the other.

23. The combination with a driven shaft, of two gears loosely mounted thereon, a driving-shaft, a gear thereon meshing with one of said loose gears, a second gear thereon for engaging the second loose gear, a cam-tooth connected with said second gear, two abutments rotating with said driving-shaft and arranged to engage opposite sides of said cam-tooth, a coupling-bolt connected with said driven shaft and arranged to engage either of said loose gears, and means for shifting said bolt from one gear to the other when both are in motion.

24. The combination with a driven shaft, of two gears loose thereon, means for driving one of said gears at a constant speed, means for starting the second gear with an accelerated speed and stopping said gear with a retarded speed, means for coupling one of said gears to said driven shaft and uncoupling the other when both are in motion.

25. The combination with a driven shaft, of two gears thereon, means for driving one of said gears at a constant speed, means for starting the second gear with an accelerated speed and stopping said gear with a retarded speed, a bolt connected with said driven shaft and arranged to engage either of said gears, and means for shifting said bolt from one gear to the other when both are in motion.

26. The combination with a driven shaft, of two gears loose thereon, means for driving one of said gears at a constant speed means for starting the second gear with an accelerated speed and stopping said gear with a retarded speed, a bolt connected with said driven shaft and arranged to engage either of said gears, cam-lugs on said bolt and a laterally-movable abutment arranged diametrically opposite the starting and stopping point of said second gear.

27. The combination with a driven shaft, of two gears loose thereon, means for driving one of said gears at a constant speed, means for starting the second gear with an accelerated speed and stopping said gear with a retarded speed, a bolt connected with said driven shaft and arranged to engage either of said gears, cam-lugs on said bolt, a laterally-movable abutment arranged diametrically opposite the starting and stopping point of said second gear, and a cam for controlling the position of said abutment.

28. The combination with a driven shaft, of two gears loose thereon, means for driving one of said gears at a constant speed, means for starting the second gear with an accelerated speed and stopping said gear with a retarded speed, a bolt connected with said driven shaft and arranged to engage either of said gears, cam-lugs on said bolt, a laterally-movable abutment arranged diametrically opposite the starting and stopping point of said second gear, and a series of cams for controlling the position of said abutment.

29. The combination with a driven shaft, of two gears loose thereon, a driving-shaft, a gear thereon meshing with one of said loose gears, a second gear on said driving-shaft for engaging the second loose gear, a cam-tooth connected with said second loose gear, two abutments rotating with said driving-shaft and arranged to engage opposite sides of said cam-tooth, a bolt connected with said driving-shaft, and means for shifting said bolt from engagement with one of said loose gears into engagement with the other loose gear while both are in motion.

30. The combination with a driven shaft, of two gears 2 and 39 loose thereon, means for driving gear 39 at a constant speed, means for starting gear 2 with an accelerated speed and stopping said gear with a retarded speed, a bolt 45 for connecting either of said gears to said shaft, an abutment 48 for operating said bolt, a cam-drum 55 for operating said abutment provided with a series of varying cam-grooves, and a pin 60 for rendering any of said cam-grooves operative.

31. The combination with a driven shaft 1, of two gears 2 and 39 loose thereon, a driving-shaft 4, carrying the gears 3 and 38, a cam-tooth 5 connected with gear 2, abutments 11 and 12 carried by shaft 4, a constantly-driven shaft 20, a clutch for connecting shafts 4 and 20, a cam on said clutch, a movable abutment for engaging said cam and holding the clutch out of action, means for coupling either gear 2 or 39 to the shaft 1, and uncoupling the other, and means for holding the movable abutment out of the path of the said cam while gear 39 is coupled to said shaft.

CHARLES R. GABRIEL.

Witnesses:
F. A. GALLAGHER, Jr.,
IRA L. FISH.